Oct. 18, 1960 C. E. HUNT, JR., ET AL 2,957,162

PUNCHED CARD TO MAGNETIC TAPE CONVERTER

Filed Oct. 24, 1956 3 Sheets-Sheet 1

CLAYTON E. HUNT JR.
RUSSELL G. THOMPSON
INVENTORS

BY Daniel I. Mayne
Robert T. Crocker

ATTORNEYS

PUNCHED CARD TO MAGNETIC TAPE CONVERTER

Filed Oct. 24, 1956 3 Sheets-Sheet 2

CLAYTON E. HUNT JR.
RUSSELL G. THOMPSON
INVENTORS
Daniel I. Mayne
BY Robert T. Crocker
ATTORNEYS Oct. 18, 1960 C. E. HUNT, JR., ET AL 2,957,162

PUNCHED CARD TO MAGNETIC TAPE CONVERTER

Filed Oct. 24, 1956 3 Sheets-Sheet 3

CLAYTON E. HUNT JR.
RUSSELL G. THOMPSON
INVENTOR.

BY Daniel I. Mayne
Robert F. Crocker

ATTORNEYS

United States Patent Office 2,957,162

Patented Oct. 18, 1960

2,957,162

PUNCHED CARD TO MAGNETIC TAPE CONVERTER

Clayton E. Hunt, Jr., and Russell G. Thompson, Rochester, N.Y., assignors to Eastman Kodak Company, Rochester, N.Y., a corporation of New Jersey Filed Oct. 24, 1956, Ser. No. 618,005

7 Claims. (Cl. 340—172.5)

This application relates to an improved punched card to magnetic tape converter for selectively recording on one or more magnetic tapes data derived from punched cards fed through the converter, card by card, from a stack of cards, without removing the selected cards from their normal order in the stack, and particularly to such a converter having provisions for combining the data derived from two classes of cards so that the data from the last preceding card of one class will be recorded immediately adjacent that from each of the selected cards of the second class.

While such a converter obviously is capable of a great variety of uses in many fields it is of particular value in conjunction with a magazine subscription fulfillment system utilizing punched cards for each subscriber and a printer arranged to print mailing address labels in accordance with the data derived from such cards. In such a system a card is ordinarily punched with the name, address and relevant subscription data for each individual subscriber. Due to the relatively limited number of columns which can be placed on a single card and the need for including as much detail as possible on each card, it is frequently necessary to restrict the number of columns available for the address. In such cases all cards for subscribers living in a particular city and State, for example, will be grouped together and an additional card will be punched with the city and State data and will be inserted in the card stack or file immediately ahead of the corresponding group of subscriber cards. To distinguish between the two types of cards in the following description, the term detail cards will be used to identify the individual subscriber cards and the term master cards or header cards will be used to identify those cards bearing merely the city and State data.

In our prior Patents 2,659,652 and Re. 23,713 we have disclosed apparatus which is useful in such a subscription fulfillment system and which includes a printer which may be controlled directly by the punched cards to automatically print data derived from the cards onto a series of mailing labels, one for each card. Our copending application S.N. 394,926, now U.S. Patent 2,899,498, further discloses such a system wherein the data from header cards can be printed along with that from each of the detail cards associated with that header card. While such a system operates very effectively when it is desired to print mailing labels corresponding to all detail cards it is subject to certain drawbacks when only certain selected cards are to be used for composing a mailing list. Thus, for example, when it is desired to mail renewal notices to only those subscribers whose subscriptions are about to expire, it is necessary to first sort out the desired card from the complete stack or file and, after having run them through the printer, reinsert them in their proper positions in the stack. Such a procedure is not only time consuming but also has the disadvantage that the master stack of cards will, during a relatively large percentage of the time, be incomplete due to the fact that certain of the cards will have been sorted out for special lists.

It is an object of this invention to provide a card-to-tape converter which may be utilized in such a system to overcome these disadvantages. Using such a converter, the data appearing on the cards will be recorded in suitable multi-digit code on one or more of a plurality of magnetic tapes which, in turn, may thereafter be utilized to supply the data to the label printer. The card-to-tape converter includes provisions for feeding the complete stack of cards, including detail cards and header cards as above described, and recording the data from the cards selectively on one or more of a plurality of magnetic tapes as controlled by predetermined code symbols punched in certain columns of the cards so that only those cards having selected code symbols will be recorded on a particular tape. Provision is further made for recording, directly adjacent the data from each selected detail card, supplemental data obtained from the last preceding header card. Provision is also made for ejecting certain cards which are no longer desired to be maintained in the complete stack, such for example, as cards for subscribers whose subscriptions have already expired.

To obtain the above results the card-to-tape converter of this invention utilizes a code sensing station at which appropriate code symbols appearing on the cards will be sensed. The output of this code sensing station selectively controls the starting and stopping of the various tape recorders associated with the unit and initiates circuits which will cause the direct recording of the data from a detailed card on the proper magnetic tape when that card reaches a later reading station. If a header card is sensed at the code sensing station, when that card reaches the reading station the data therefrom will be fed to a storage or memory unit where it will be retained until the next header card is sensed. The arrangement is such that this header card information will be read out from the storage unit to the appropriate recorder or recorders once for each related detail card so that the header information will be recorded on the tape immediately adjacent the data from each of its associated detail cards.

Further objects of the invention will appear from the following complete specification especially when considered in the light of the accompanying drawings and the appended claims.

Figure 1:
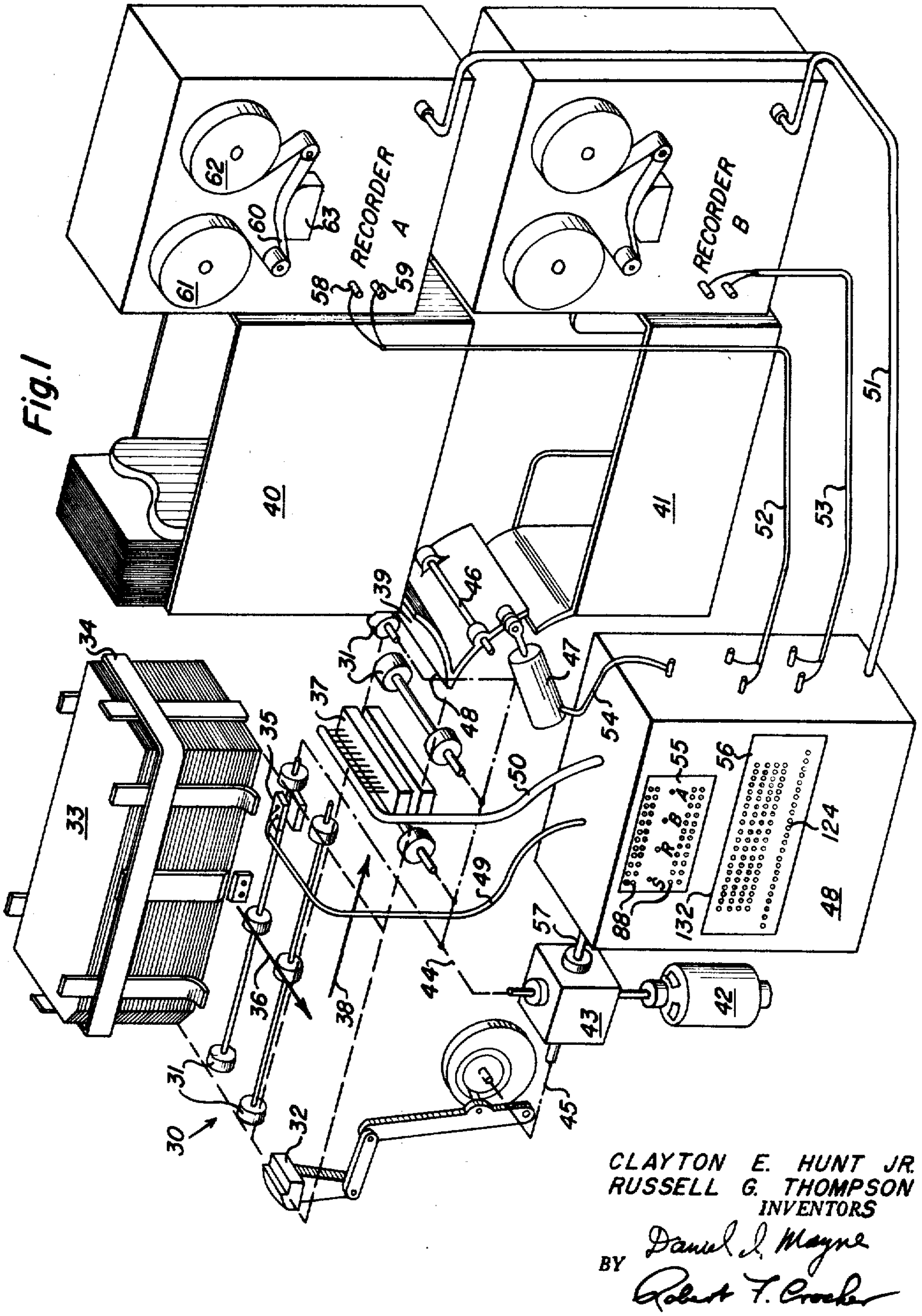
Fig. 1 is a diagrammatic view of a card-to-tape converter embodying our invention.

The general arrangement of our card-to-tape converter is shown in somewhat diagrammatic form in Fig. 1. As illustrated therein it includes a suitable card feeding mechanism 30, which may be similar to that shown in detail in the copending Hunt application Serial No. 474,169, now U.S. Patent 2,848,535, and includes suitable feed rollers 31 and reciprocating pushers 32 (only certain ones of which are shown for purposes of illustration) for cyclically feeding cards 33, one by one, from a supply hopper 34, past a code sensing station 35 as indicated by arrow 36, then endwise past a card reading station 37 as indicated by arrow 38 and either over a deflector 39 to a restacking hopper 40 or beneath the deflector to a reject hopper 41. The rollers and pushers are driven by a motor 42 through a suitable transmission 43 and shafting diagrammatically indicated by the dashdot lines 44 and 45. Conventional control circuits (not shown) for motor 42 will, of course, be provided as is usual with such card feeding mechanism.

The deflector 39 is pivotally mounted as by means of a shaft 46 about the axis of which it may be rocked by a reject solenoid 47 between its normal position shown in Fig. 1 wherein cards will be deflected upwardly into the restacking hopper 40, and a reject position wherein its front edge 48' is raised above the plane of movement of a card leaving the reading station 37 so as to deflect such card downwardly into the reject hopper 41. A suitable spring (not shown), which may be incorporated in the solenoid unit itself, tends to urge the deflector into the normal position shown.

The code sensing and card reading stations 35 and 37 are connected as by means of cables 49 and 50 to a data switching, storing, and control unit 48, the output of which serves to control the operation of a pair of tape recorders A and B. Recorders A and B are of the conventional type commonly used to magnetically record data in a plurality of channels on a tape. Each includes a Start terminal 58 and a Stop terminal 59 for controlling the feeding of magnetic tape 60 from a supply reel 61 to a take-up reel 62, and the recording of data thereon by a multiple recording head 63. In the instant case the recorders are of the 7-channel type adapted to record in seven parallel channels on the tape, six of which are used for data and the seventh of which is used for recording sync pulses. As is usual with such recorders, the recorders also include suitable recording amplifiers 64, one associated with each channel of the recording heads 63. Starting and stopping of the recorders is controlled by the application of a short electrical pulse to the appropriate Start or Stop terminal 58 or 59 of the recorder. The recorders will continue to operate after having once been started by a pulse applied to the Start terminals 58 until a subsequent pulse is applied to the Stop terminal 59. The recorders utilized are moreover of the type in which no actual recording will take place unless the recorder is in operation, with the tape 60 moving past the heads 63.

The data to be recorded, and which is derived from the cards as they pass the card reading station 37, is fed to the recorders from unit 48 through cable 51. The control unit 48 serves to control the starting and stopping of the individual recorders in accordance with the code sensed as the cards pass the code sensing station 35, by means of cables 52 and 53. Reject solenoid 47 is also controlled from the unit 48 to which it is connected by cable 54.

The control unit 48 includes a decoder plugboard 55 and a memory input plugboard 56, the function and operation of which will later become apparent. Synchronization of the various switching and control functions of control unit 48 with the feeding of the cards is obtained by means of a suitable synchronizing shaft 57 connecting synchronizing means in the unit 48 to the card feed transmission 43.

As previously mentioned, the operation of the recorders and the routing of the data thereto is controlled automatically in response to the sensing of identifying code punchings on the individual cards 33. Any desired number of card columns could, of course, be used for such code designations but, to avoid unnecessary confusion, it will be assumed that all code designations will appear in one or the other of two adjacent columns on a card. Furthermore, in order to simplify the explanation, and without in any sense intending to thereby limit the invention, it will be assumed that each class of card will be designated by a single perforation, individual to that particular class, located in one or the other of the two selected columns, which will be assumed to be the 79th and 80th columns.

In practice a more complicated multiple-digit coding may well be employed without in any way departing from the principle of operation of the invention. Decoding matrices which will sense and decode such multiple-digit codes are well known in the tabulating art and could obviously be substituted for the decoding arrangement to be described herebelow by anyone skilled in the art.

Thus the header or master cards which, as previously described, may have punched therein the city and State information, will each bear a distinctive code symbol, which will be assumed to be in this case an "X" punching in the 80th column. The data field on these master cards will be assumed to be located in columns 6 through 30. It will further be assumed that the code punching for the various classes of detail cards will be located in their 79th columns and that the subscription data and the remaining portion of the subscriber's address will appear in the first seventy-eight columns. For purposes of explanation of the operation of the unit it will be assumed that any detail card having a "9" punch in its 79th column is to be recorded on recorder A, any card having a "1," "2," or "3" punch in its 79th column will be recorded on recorder B, and any card having a "12," "X" or "0" punch in its 79th column is to be ejected from the stack. The stacked cards 33 are placed in the feeding hopper 34 face down and with the "12" edge or top of the card leading.

Thus, the cards will pass through the card reading station 37 with their 80th column leading and, as will later appear, the data will therefore be recorded on the tapes reversed from its normal order. However when, as is contemplated, the tape is subsequently used to feed the data to label printing equipment for example, the tape can merely be run in the reverse direction (without any need for a separate rewind operation) and the data will be fed to the printer in its normal order (first column, first).

The cards themselves will normally be arranged in a predetermined order. For example, in a subscription fulfillment system they would ordinarily be arranged in the master file in alphabetical order by city and State and subscriber's name, with a header card bearing the city and State data immediately ahead of the detail cards of all subscribers living in that city and State.

Figure 2:
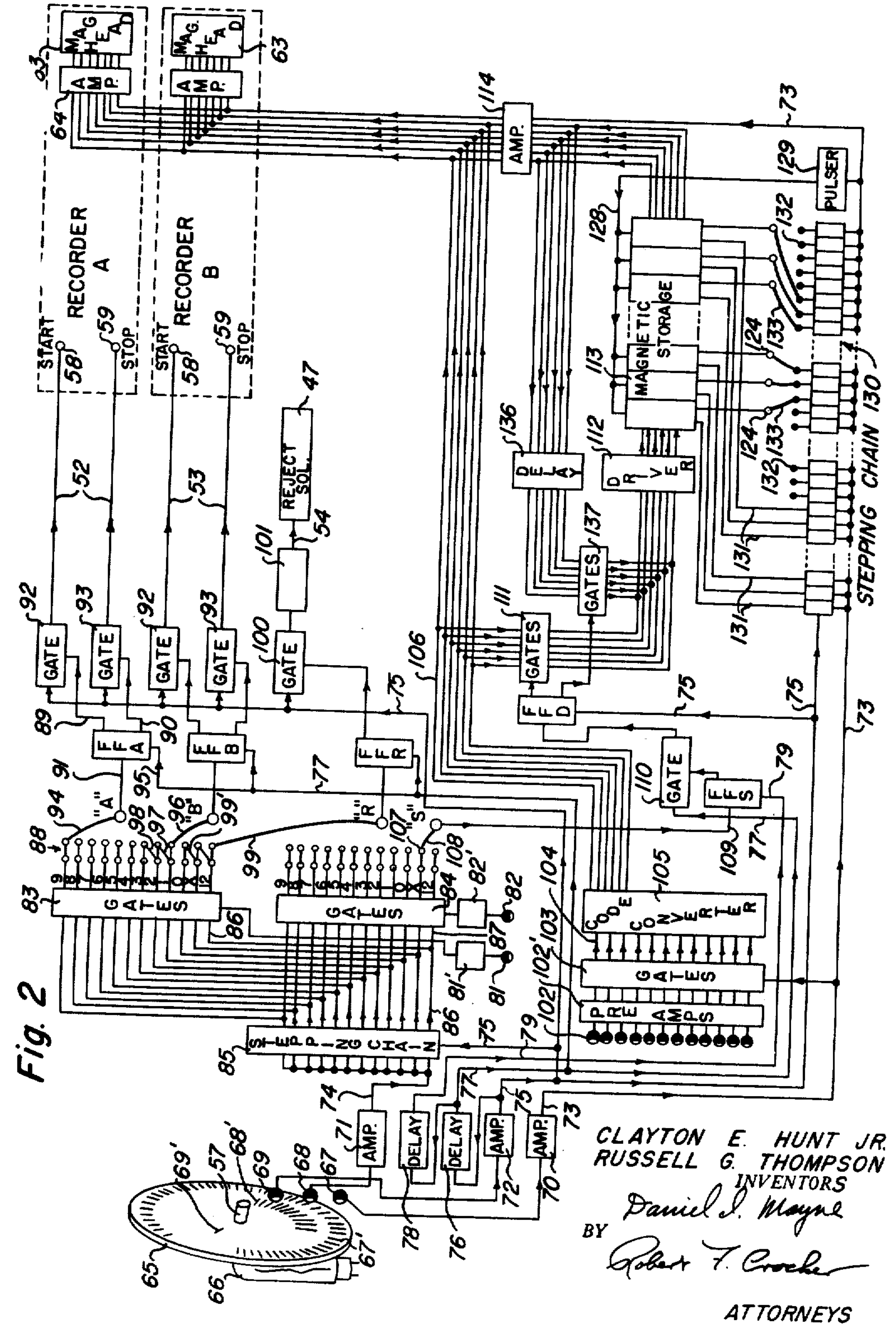
Fig. 2 is a block diagram of the electrical circuitry utilized in the converter.
Figure 5:
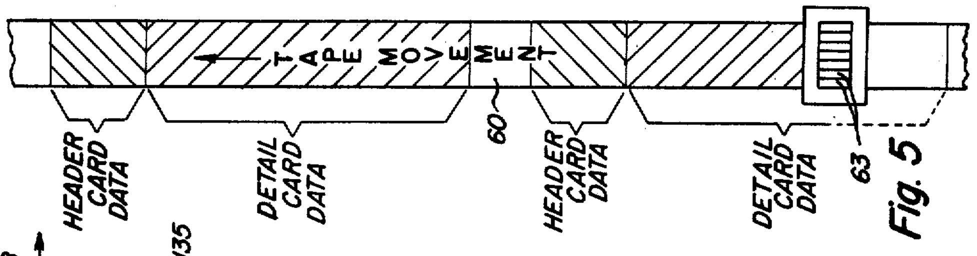
Fig. 5 is a diagrammatic view showing the manner in which the data derived from the cards will be recorded on a typical tape.

Turning now to Fig. 2 the synchronizing means incorporated in unit 48 comprises a timing disk 65 which is continuously driven at a constant speed of rotation by shaft 57 so that it makes one complete revolution per card cycle. This disk is interposed between a suitable light source 66 and three photocells 67, 68 and 69 respectively, which are arranged at different radial distances from the axis of the disk. Suitable timing marks are provided on the disk between the light source and each of the photocells so that each time a mark is swept between the light source 62 and one of the cells a timing pulse will appear at the output of the associated photocell amplifier 70, 71, or 72. The card feed mechanism is so arranged as to feed the cards past the reading station 37 with approximately half a card spacing between successive cards, so that a card cycle is the equivalent of 120 columns passing the reading station. The outermost row of timing marks 67' comprises one hundred and four uniformly spaced marks, the last eighty of which are synchronized with the passage of the eighty card columns of a card moving past the reading station 37. The pulses generated by these marks 67' and appearing on output line 73 of amplifier 70 will be herein termed the column sync pulses. The middle row of timing marks 68' associated with photocell 68 comprises twelve marks which are synchronized with the movement of the digit positions in a given column past the code sensing station 35. The pulses generated by these marks 68' and appearing on output line 74 of amplifier 71 will be herein termed the digit sync pulses. The inner row comprises a single timing mark 69' associated with photocell 69 and so located with respect to the marks in the outer and middle rows as to produce a first control pulse on line 75 at the output of its associated amplifier 72 shortly after the last column (which will actually be column 1) of a card leaves the reading station. For purposes that will be hereafter made clear, the output of amplifier 72 is also applied to the input of a first delay amplifier 76 so that a short time following the first control pulse, a second control pulse will be generated on the output lead 77 from delay amplifier 76. This second control pulse is also utilized to generate a third control pulse by applying it to the input of another delay amplifier 78 on the output line 79 of which this third control pulse will appear. The spacing between these three control pulses represents but a minor portion of the period between the end of the last column sync pulse of one card cycle and the first column sync pulse of the next card cycle.

In the arrangement chosen for purposes of description the code sensing station 35 comprises two photocells 81 and 82 adapted to be suitably supported and positioned over the path of movement of the 79th and 80th columns of the cards passing through this station. As is explained in detail in copending application Ser. No. 474,169, a source of light (not shown) is positioned beneath the path of travel of the cards at the code sensing station so that each time a perforation in the card in either of these columns passes beneath the corresponding photocell 81 or 82 the sudden increase in light falling on the cell will cause an output pulse to be generated at the output of the associated preamplifier 81′ or 82′. These pulses are used to control the opening of a plurality of electronic gates 83 and 84 respectively, there being one gate 83 for each of the twelve digit positions of the 79th card column and one gate 84 for each of the twelve digit positions of the 80th column. Outputs of the series of gates 83 and 84 are applied to individual plugboard terminals 88 on plugboard 55.

A conventional electronic stepping chain 85 is arranged to be stepped along, stage by stage, in response to the twelve digit sync pulses appearing on line 74, the arrangement being such that as each stage is triggered in sequence a corresponding pulse will be generated at the output of that stage and will be applied as at 86 and 87 to the inputs of the gate 83 and of the gate 84 corresponding to that particular digit position. This series of pulses cannot however pass through either gate 83 or 84 unless, at the same instant, the particular gate is being held open by a gating pulse from the associated photocell preamplifier 81′ or 82′ due to passage of a hole beneath the photocell 81 or 82. Thus, if a "3"-punch is present in the 79th column, for example, the pulses derived from the first 5 stages of stepping chain 85 (corresponding to digit positions "12," "X," "0," "1" and "2" will not be permitted to pass through either gates 83 or 84, whereas the pulse obtained from the sixth stage will coincide in time with the brief opening of the corresponding gate 83 due to sensing of the perforation by photocell 81, and will appear at the plug board terminal 88 for the corresponding digit position. Thus, the cells 81 and 82 and the gates 83 and 84 together with the stepping chain 85 serve as a means for sensing and decoding the particular code designation on each card as it traverses the sensing station.

The pulses appearing on the plug board terminals 88 are utilized to control the operation of the recorders A and B, the operation of the reject solenoid 52, and the routing of the data derived from the reading station 37. To control the recorders A and B two conventional flip-flop units FFA and FFB, respectively, are provided. These flip-flops are so arranged that in their normal or Off position a relatively low voltage will be present at the upper output 89 and at the same time a relatively high positive voltage will appear at the lower output 90. However, when a pulse is applied to the triggering input 91, the flip-flop will be changed to its On condition in which the voltage on line 89 will be relatively high and that on line 90 will become relatively low. Flip-flops FFA and FFB are arranged to be reset to their Off condition each card cycle by the second control pulse appearing on line 77. A pair of gates 92 and 93 is associated with each of these flip-flops, these gates being controlled by the voltages present on the output lines 89 and 90 so that gate 92 will be biased open or operative so long as the associated flip-flop is in its On condition while gate 93 will be open or operative whenever the associated flip-flop is in its Off condition. The input to flip-flop FFA is connected to a plug board terminal "A" which may be connected as by means of a suitable flexible plug wire 94 to any one of the plug board terminals 88. In the particular case, since it is desired that all detail cards having a "9" punch in their 79th column should be recorded on recorder A, terminal "A" is connected to the "9" digit position associated with the 79th column. Thus, any time that a "9" punch is detected at the code sensing station 35, flip-flop FFA will be turned On to in turn open the Start gate 92 for recorder A. When, at the start of the next cycle, the first control pulse appears on line 75, this pulse will therefore be permitted to pass through Start gate 92 to the Start terminal 58 of recorder A, placing this recorder in operation. As previously mentioned, recorder A will continue to run until a Stop pulse is applied to its Stop terminal 39. However, shortly after this first control pulse has been applied to recorder A, the second control pulse, appearing on line 77, will be applied to flip-flop FFA causing the latter to reset to its normal or Off condition ready for another cycle of operation.

The arrangement for controlling recorder B is identical to that for recorder A, the plugboard terminal "B" for the associated flip-flop FFB being connected, for example, as by plug wires 96, 97 and 98 to the "1," "2" and "3" digit positions for the 79th column on plugboard 55. Thus, recorder B will be started whenever a "1," "2" or "3" punch is sensed by the code sensing station in the 79th column of a card.

To control the reject solenoid 52, and thereby the ejection of selected cards from the stack, a third flip-flop FFR is arranged so that its input plug board terminal "R" may be connected by suitable plug wire connections 99 and 99′, for example, to be responsive to pulses appearing at the "12," "X" or "0" digit positions of decoder plugboard terminals 88 for the 79th column. Whenever this flip-flop FRR is turned On in response to the sensing of a "12," "X" or "0" punch in the 79th column, the associated gate 100 will be turned On or opened so that, upon the generation of the first control pulse at the start of the next cycle, this control pulse may pass through the gate 100 to a pulse stretcher 101 which, for example, may be in the form of a monostable multivibrator arranged to produce at its output a positive voltage of predetermined duration in response to a triggering pulse and to thereafter return to its normal or Off condition. This output is applied to the reject solenoid 52, the timing and duration of the output from pulse stretcher 101 being such that the deflector 39 will be raised to its reject position somewhat before the leading edge of the card to be rejected reaches the deflector and will remain in this condition until after the leading edge of the card has begun to move along the lower surface of the deflector 39 and into the reject hopper 4. As previously mentioned a suitable spring will return the deflector 39 to its normal position before the next card reaches the deflector.

Figures 3, 4:
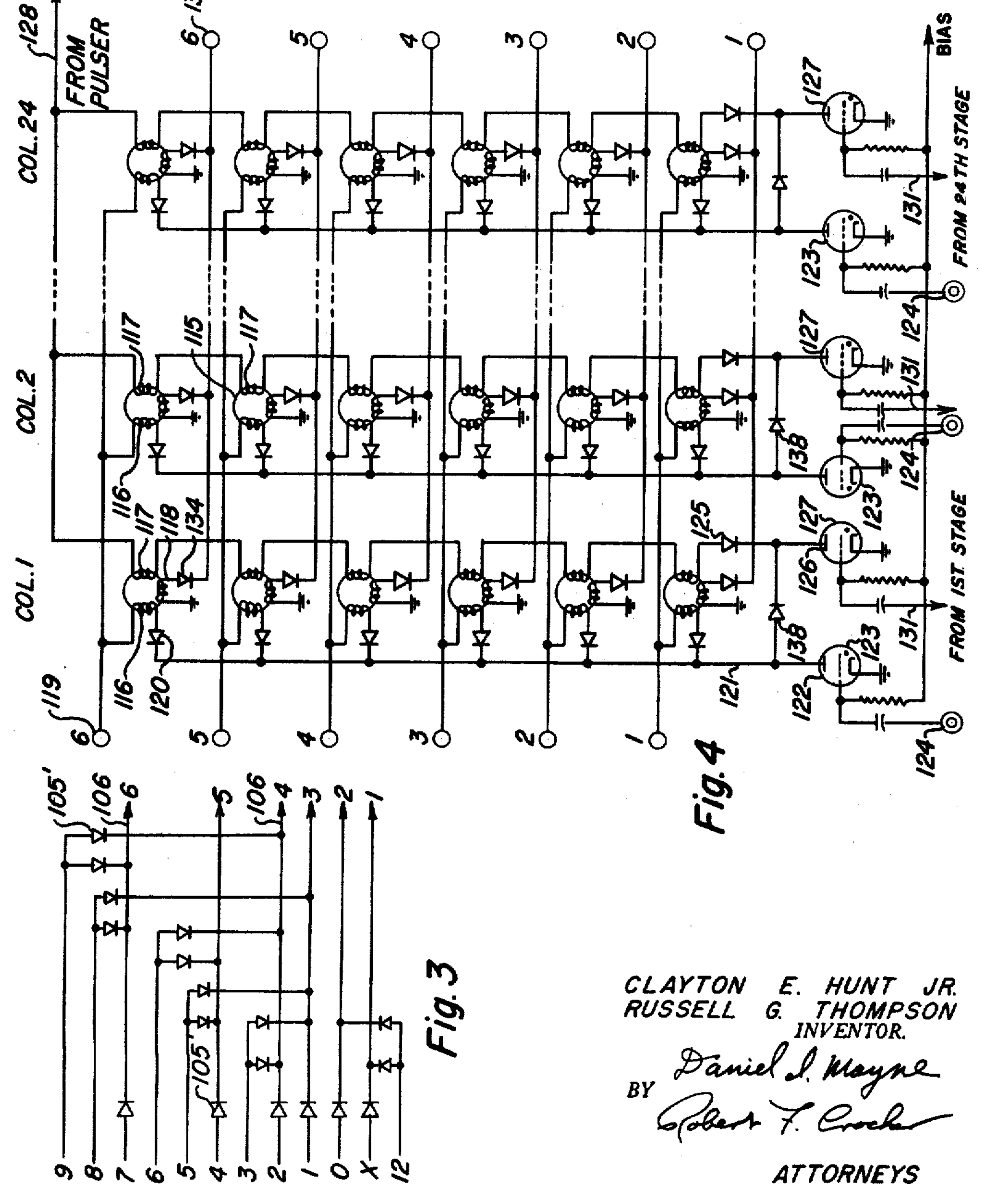
Fig. 3 is a schematic diagram of a code converter incorporated therein.
Fig. 4 is a schematic diagram of the data storage unit utilized.

The reading station 37 includes twelve photocells 102 similar to photocells 81 and 82, one associated with and responsive to punchings in each digit position as the cards move past the station. The output of each of the photocells 102 is applied through suitable preamplifier 102′ to the input of an associated gating amplifier, one for each digit position, and all of which are designated by the reference numeral 103. The gating amplifiers 103 are controlled by the column sync pulses appearing on line 73 so that whenever a hole is sensed by one of the photocells 102 at the same time that a column sync pulse is present on the line 73 a pulse will appear at the output of the associated gate and will be applied as at 104 to the corresponding input of a code converter 105 which is adapted to convert the 12-digit code utilized on the cards to a 6-digit code suitable for recording. A suitable code converter utilizing a plurality of ordinary diodes 105′ is shown in Fig. 3. The 6-digit coded pulses appearing at the outputs 106 of the code converter as each column passes the reading station are applied, in parallel, to the recording input terminals of the recorders A and B so that if either or both of these recorders are in operating condition at the time, the coded information will be recorded by the heads 63 in the appropriate channels on the magnetic tape or tapes.

So far as the above-described apparatus is concerned, it will therefore be able to record selectively, or to reject from the stack, each of a series of cards passing through the apparatus. There will be a space between recordings of successive detail cards equal to roughly forty columns. The last twenty-four columns of this inter-card space is utilized according to the present invention for recording information from the last preceding header card which has passed through the apparatus.

Whenever a header card passes the code sensing station 42 a pulse will appear at the "X" position plugboard terminal 88 associated with the 80th column and identified by numeral 107. This pulse is applied through a plug-wire 108 to a header card control plug-board terminal "S" which is connected to the triggering input 109 of a flip-flop FFS so as to turn the latter from its normally Off to its On condition. As a result the associated gate 110 will be turned On or opened so that when the second control pulse of the next card cycle appears on line 77 this pulse may pass through gate 110 to energize or turn On a data-controlling flip-flop FFD. Whenever flip-flop FFD is in its On condition, gates 111 will be open so that information appearing at the output of the code converter may pass through these gates 111 to suitable driver amplifiers 112 and thence to the input of a data storage unit 113 which includes a 24 column, 6-channel magnetic storage matrix, details of which will be described herebelow. For the present consideration, suffice it to say that the storage unit 113 is arranged to store, column by column, the data read from a header card as it traverses the reading station and to thereafter read out this information and apply it through isolating amplifiers 114 to the recorders A and B during the 24-column interval immediately preceding the recording of data from each following detail card associated with that header card.

The magnetic storage or memory device 113 is illustrated in Fig. 4 and comprises a plurality of magnetic storage cores 115 arranged in twenty-four columns and with six cores in each column, one corresponding to each of the six digit code positions. Each core is provided with a read-in winding 116, a read-out winding 117 and an output winding 118.

The read-in windings 116 corresponding to a particular digit are all connected in parallel to the corresponding input terminal 119 for that particular code digit position. The other sides of the input windings 116 of the six cores for each column are connected through suitable isolating diodes 120 to a common lead 121 which is connected directly to the anode 122 of an associated read-in thyratron 123, one such read-in thyratron being provided for each column. The grids of the read-in thyratrons 123 are connected as shown to individual plugboard terminals 124 on plugboard 56.

The read-out windings 117 associated with the cores of each column are connected in series with one another and, through an isolating diode 125, to the anode 126 of a read-out thyratron 127. The other ends of the series of read-out windings 117 for all columns are connected by means of a line 128 to the output of a pulser 129 (Fig. 2) which is adapted to generate a positive pulse of predetermined duration in response to each of the column sync pulses.

The column-by-column triggering of the read-in and read-out thyratrons 122 and 127 is controlled by a 104-stage stepping chain 130 which is stepped along, stage by stage, in response to the column sync pulses appearing on line 73 and is reset at the start of each card cycle by the first control pulse. As each stage of the stepping chain 130 is turned On, a positive triggering pulse appears at its output, these triggering pulses being utilized to control the firing of the memory control thyratrons 123 and 127. The first twenty-four stages of the counting chain serve to sequentially control the read-out thyratrons 127 to which they are connected by leads 131. The remaining 80 stages of the stepping chain 130 have their individual outputs connected to suitable plug board terminals 132 any of which may be connected as by plug wires 133 to the read-in plugboard terminals 124 associated with the read-in thyratrons 123 of the memory unit. With this arrangement the storage columns may be rendered operative, column by column, twice during any card cycle, once for the read-out of information in synchronism with the first twenty-four column sync pulses and again upon the firing of the read-in thyratrons, when those stages of the stepping chain 130 which are connected thereto by plug wires 133 are actuated. It was earlier assumed that the desired data to be obtained from the header card was to appear in columns 6 through 29 and Fig. 2 therefore shows these particular stages of the counting chain 130 connected to the read-in terminals 124 of the magnetic storage unit 113.

The output windings 118 for a particular digit position in each column of the storage device 113 are connected in parallel through suitable isolating diodes 134 to the corresponding output terminal 135.

The memory unit operates as follows to store and read-out the data applied to its input terminals from the header cards. If, during the interval while the read-in thyratron 123 of any particular column is biased to operative condition by the triggering pulse from its associated stage of the stepping chain, a positive pulse derived from the data on the card appears at any input terminal 119 the thyratron will fire, and current will be permitted to flow through the corresponding input winding 116 and diode 120 for that particular column, magnetizing the associated core 115. While the thyratron will be extinguished as soon as the input pulse has decayed, the core will remain magnetized thereby effectively storing that particular bit of information.

However, when the read-out thyratron 127 for that particular column is later rendered operative by its associated stage of the counting chain 130, the read-out pulse from pulser 129 will cause that read-out thyratron to fire and current to flow through all six read-out windings 117 for that column. The direction of winding is such that this produces a sudden reversal of the magnetism in any core having data stored therein, thereby inducing an output pulse in the output winding 118 for that core, which pulse is of proper polarity to pass through diode 134 to the corresponding output terminal 135. The magnetic characteristics of the cores are such that only when a core has been previously magnetized by an input pulse, will there appear an output pulse at the corresponding output terminal 135 in response to a read-out pulse.

Since read-out destroys the magnetic condition corresponding to the storage of information in a core, provision must be made to re-store this same information in the core for use in succeeding cycles. To this end the output pulses from the memory unit are applied to a six-channel delay amplifier 136. The resulting pulses at the output of delay amplifier 136 will appear slightly after the original output pulses have decayed but before the decay of the read-out pulse from pulser 129. These delayed pulses are applied through gates 137 (which will be open so long as flip-flop FFD is in its normal or Off condition) to driver amplifiers 112 and thence to the memory input terminals 119. A diode 138 is connected between the anodes of the read-in and read-out thyratrons 123 and 127 for each column, so that these delayed pulses appearing at the input terminals 119 may now pass through the corresponding read-in windings 116, diodes 120 and diode 138 to the read-out thyratron 127 which will still be held conducting by the read-out pulse from pulser 129. Immediately thereafter the read-out pulse will decay, deenergizing the read-out windings 117. However, the appropriate ones of input windings 116 will continue to pass current until the decay of the delayed pulses, so that these latter pulses will once again cause magnetization of the corresponding cores, restoring them to the condition which existed prior to read-out. This read-out and immediate re-storing of the data in the memory will proceed, column by column, as the stepping chain steps along, stage by stage. Thus, the data derived from a header card will be effectively maintained in the storage unit until the gates 137 are shut signalling the arrival of a new header card. When this occurs the feed-back circuit through delay amplifier 136 will be rendered inoperative so that read-out will clear the memory in preparation for the storing of data from the new header card.

Overall operation of the card-to-tape converter of our invention will best be understood by following the sequence of operation for a series of cards passing therethrough. It will be assumed that the first card is a header card, the next two cards are detailed cards, the first of which is to be recorded by recorder A, and the second by recorder B, that the next card is a detail card which is to be ejected from the stack, that the fifth card is another header card, the sixth card is a detail card which is to be recorded on both recorders A and B while the seventh card is to be recorded on recorder A. For ease of explanation a card cycle will be considered to start with the generation of the first control pulse by timing mark 69' and its associated photocell 69. The first control pulse, appearing on line 75 will reset stepping chains 85 and 130 to their normal or starting condition and will likewise reset flip-flop FFD, which controls the data switching gates 111 and 137, to its normal or Off condition if it is not already in that condition. Shortly after this, the second control pulse will be generated by delay amplifier 76 and will be applied through line 77 to reset flip-flops FFA, FFB and FFR to their normal or Off condition. It will be assumed that flip-flop FFS is already in its Off or reset condition and that gate 110 will be biased to its closed or inoperative condition. Therefore the second delay pulse 77 will be unable to pass through gate 110 to energize flip-flop FFD. The third control pulse, appearing on line 79, would serve to reset flip-flop FFS, were it not already in its Off condition.

While this series of pulses is being generated, the first card, which, being a header card, has an "X" in its 80th column, will be approaching the code sensing station 35. Simultaneously with the passage of the "12" digit position of the card past the code sensing station the first of the twelve digit sync pulses will be generated by photocell 68 in cooperation with timing marks 68'. The first of these pulses will cause an output pulse to appear on the output side of the first stage of stepping chain 85 which will be applied through lines 86 and 87 to gates 83 and 84 for the corresponding "12" position. However, it will be assumed that no hole appears in the card in the "12" position in either the 79th or 80th column of a header card, so that gates 83 and 84 will be at this time closed and no pulse will appear on the corresponding plug board terminals 88. At the generation of the second digit sync pulse however, the pulse from the second stage of stepping chain 85 will coincide with the pulse derived from photocell 82 as it senses the punch in the 80th column of the master or header card. As a result a pulse will appear at the "X" position plugboard terminal 107 and will be applied through plug wire 108, plugboard terminal "S" and lead 109 to the input of flip-flop FFS, causing the latter to be turned On and to open gate 110, which will remain open so long as flip-flop FFS remains in its On condition. As the card continues to advance past the code sensing station, digit-position by digit-position, the remaining gates 83 and 84 will remain closed since there are no other punches in this particular column of a master card.

Meanwhile a series of column sync pulses is being generated by photocell 67 in cooperation with the associated timing marks 67'. These column sync pulses are applied to gates 103 to open these gates briefly, once for each pulse, and also to the memory stepping chain 130 to cause the latter to step along, stage by stage. The preamplifiers 81', 82' and 102' associated respectively with the photocells 81 and 82 at the code sensing station 35 and the photocells 102 at the card reading station 37 are of the known type that will produce an output pulse only upon an abrupt increase in light falling thereon, so that no output will appear during the steady state conditions when no card is passing these stations. Therefore although gates 103 will be briefly opened during each column sync pulse of this first card cycle there will be no pulse appearing thereat from preamplifiers 102'.

Stepping of the chain 130 will run the storage unit 113 through a complete read-out cycle but this will likewise have no effect since the recorders are both stationary. No read-in of additional data to the memory unit will occur since, as above mentioned, no data pulses will be generated by the photocells 102 during this cycle.

Shortly after the end of this card cycle, the first control pulse, signalling the beginning of the next card cycle, will be generated by photocell 69. As before, this pulse will reset stepping chain 85 and stepping chain 128 to prepare them for a new cycle of operation. Flip-flop FFD is already in its reset condition so no action will be produced thereon by this first control pulse. However, when the second control pulse is generated on line 77, this pulse will pass through gate 110 (which is still being held open by flip-flop FFS) to energize the switching flip-flop FFD so as to turn it On. This will cause gates 111 to be biased to their open or conducting condition and will cause gates 137 to be closed or rendered inoperative. Flip-flops FFA, FFB and FFR are still assumed to be in their Off or reset condition so that pulse 77 will have no effect thereon.

The third control pulse, appearing on line 80, will reset flip-flop FFS to its Off condition, which, in turn, will again close gate 110. However, flip-flop FFD has already been turned On and will remain in this condition until the next pulse on line 75. At a time twenty-four columns before the header card reaches the reading station 37, the first of the column sync pulses will be generated by photocell 67, energizing the first stage of the counting chain 130 and likewise opening the gates 103 in the card reading circuit. The first twenty-four column sync pulses will run the storage unit through a read-out cycle but, since gates 137 are now closed, the delayed pulses from delay amplifier 136 cannot be re-entered in the memory and any previously-stored data will therefore be erased by this read-out operation. Counting chain 130 will continue to step along, the remaining stages being rendered operative in synchronism with the passage of the corresponding columns of the header card through the card reading station 37. Thus, when the 29th column of the header card reaches the reading station, the data punched therein will cause the generation of an output pulse from one or more of the photocells 102, depending upon the particular punchings present in the card in this column, and these pulses will pass through the gates 103 and code converter 105 to the output 106 thereof. Since gates 111 are now being held in open or operating condition by flip-flop FFD, the resulting data pulses appearing at the output of the code converter 105 will pass through these gates and driver amplifiers 112 to the corresponding input terminals 119 of the storage unit 113. As this same instant the 76th stage of counter chain 128, corresponding to this card column, will be rendered operative and, through its plug wire 133 will cause firing of the read-in thyratron 123 associated with the first column of the storage unit. Thus the data derived from column 29 of the card will be read into the appropriate storage cores 115 of the first column of the storage device. This same sequence will repeat, column by column, until the 6th column of the header card has been stored in the 24th column of the memory. The remaining five stages of the counting chain 128 will be sequenced in turn but will produce no further action.

Meanwhile, the second card, which, as previously described, is to be recorded on recorder A and will therefore have a "9" punch in its 79th column, will be passing through the code sensing station 35. When this "9" punch passes beneath the photocell 81 an output pulse will be produced at the "9" plug board terminal 88 and will pass through plug wire 94 to plug board terminal "A" and thence to the input 91 of flip-flop FFA. Flip-flop FFA will therefore be turned On so as to bias Start gate 92 associated with recorder A to its open condition.

When the next control pulse, which is the first control pulse of the next cycle, appears on line 75, this pulse will therefore be permitted to pass through gate 92 to the Start terminal 58 of recorder A, placing this recorder in operation and rendering it responsive to input signals. This same control pulse will also reset flip-flop FFD, closing gates 111 and reopening gates 137. Shortly thereafter, the second control pulse will reset flip-flop FFA to close the associated Start gate 92 but, as previously described, this will have no effect upon recorder A since the recorders are of the type which, when once started in operation, will continue to operate until a Stop pulse is fed to its Stop terminal 59. Since flip-flop FFS is not energized at this time, gate 110 will be closed so that this second control pulse will be unable to pass to flip-flop FFD to energize the latter. The third control pulse will have no effect since flip-flop FFS is already deenergized.

When the first of the timing marks 67' passes opposite photocell 67 the first stage of stepping chain 130 will be energized to apply a read-out triggering pulse to the corresponding first column of the magnetic storage unit 113. As a result the information stored in this first column will be read out therefrom and pass through amplifier 114 to the recording input terminals of the recorders A and B. Since recorder A is now in operation, the corresponding data pulses will be recorded in the appropriate channels on the magnetic tape. The sync pulse will also be applied directly through amplifier 114 to the seventh channel of the recorders and will be recorded on this channel in recorder A. While the sync pulse and the pulses read out from the magnetic storage unit will also be applied to recorder B, they will not be recorded thereon since the latter is still inoperative.

During the read-out and recording of information from the storage unit 113, the read-out pulses will, as previously described, also be applied through the feedback circuit including delay amplifiers 136 and gates 137 to the input terminals 119 of the storage unit so that the information being read out from the storage unit will again be stored therein ready for the next cycle. This read-out, recording and re-storing of information from the magnetic storage unit 113 will continue, column by column, until the 24th stage of the counter chain 130 has been energized. By this time the detail card will have moved to the reading station 37 and at the next sync pulse the data derived from the 80th column of the detail card will then be passed through gates 103 and code converter 105 to the recorders and will be recorded in the appropriate channels of recorder A. The remaining columns will then be similarly recorded directly from the card, column by column, until the last column (which is column 1 of the card) is reached. The data from the card will be prevented from being read into the memory 113, however, since gates 111 will be closed at this time.

Meanwhile the second detail card is passing through the code sensing station 35. As previously described this second card is to be recorded on recorder B and will be assumed to have a code punch in the "3" digit position of its 79th column. When this punch mark reaches the code sensing photocell 81 an output pulse will appear on the "3" plug board terminal 88 and will be transmitted through the plug wires 97 and 96 and the plug board terminal "B" to turn on flip-flop FFB and to thereby bias the Start gate 92 associated with recorder B to its open condition.

Nothing further will occur until the end of that card cycle when the first control pulse, signalling the beginning of the next card cycle, will appear on line 74, resetting stepping chains 85 and 130 and passing through Start gate 92 to the Start terminal 58 of recorder B to place this recorder in operation. This same pulse will also pass through Stop gate 93 associated with recorder A to its Stop terminal 59 to stop the operation of recorder A. The second control pulse, on line 77, will thereupon cause the reset of flip-flop FFB to its Off condition, closing the Start gate 92 and opening the Stop gate 93 associated with recorder B. Read-out and re-storage of information from the storage unit 113 will proceed as before. However, since only recorder B is now in operation, the stored data will be recorded only on the tape associated therewith. As soon as the second detail card has moved into the reading station 37, the data derived directly from this card will similarly be recorded on the tape of recorder B. As before, gates 111 are still closed so that this data from the card is prevented from being read into the storage device 113.

Meanwhile the fourth card, which, as previously described, is to be ejected from the stack, is passing through the code sensing station. This card will be assumed to have an "X" hole in its 79th column and, when this "X" hole is detected at the code sensing station 35 by photocell 81, a pulse will be applied through plug wire 99 to reject plug board terminal "R" to turn flip-flop FFR On. This will in turn bias reject gate 100 to its open or operative condition and, when the next control pulse, signalling the beginning of the next card cycle, appears on line 75, this pulse will pass through gate 100 to pulse stretcher 101, to energize reject solenoid 47. By this time the leading edge of the preceding detail card will have passed beyond the front edge 48' of deflector 39 and this card will therefore have already been started on its course into storage hopper 40. Thus, while the front edge 48' of deflector 39 will tend to be raised above its normal position, that card will continue on its path into storage hopper 40. However, the reject solenoid will remain energized throughout the major portion of this new card cycle due to the pulse-stretching action of pulse stretcher 101.

Returning to the action of the first control pulse following the detection of the card to be rejected, this pulse will likewise reset flip-flop FFB so that the second control pulse of this cycle will pass through the now open Stop gate 93 to the Stop terminal 59 of recorder B, stopping the operation of the latter. As before the first control pulse will also reset stepping chains 85 and 130. While read-out and re-storage of the data from the storage unit 113 will once again occur, the read-out information will not be recorded on either tape since both recorders A and B will be in their inoperative condition during this time. Similarly, although data pulses, derived directly from the detail card to be rejected, will appear at the output of the code converter 105, no recording of this data will occur nor will the pulses be able to pass through gates 111 to the magnetic storage unit 113. However, as the cycle continues the leading edge of the card will reach the deflector 39 which will still be in its raised position, and the card will be deflected downwardly by the lower surface of the deflector into reject hopper 41. The duration of the output from pulse stretcher 101 is such that solenoid 47 will not be deenergized until somewhat after the leading edge of the card to be rejected has reached the deflector 39. At the end of this pulse the solenoid 47 will, however, be deenergized in preparation for the next card cycle.

While this reject card is passing through the reading station, the next card, which has been assumed to be another header card will be traversing the code sensing station 35 and, when the "X" punch in its 80th column is sensed by the photocell 82, flip-flop FFS will once again be turned On to bias gate 110 to its open condition. At the end of this cycle the first control pulse, appearing on line 75, will again reset the stepping chains. This first control pulse will however be unable to pass through Start gates 92, associated with recorders A and B, nor through gate 110, associated with reject solenoid 47, since flip-flops FFA, FFB and FFR will now be in their Off or deenergized condition. The second control pulse, appearing on line 77, will, however, be permitted to pass through gate 110 to turn switching flip-flop FFD On thereby opening gates 11 and closing gates 137. As the header card approaches the reading station 37 the information stored in storage unit 113 will once again be read out, column by column, under the control of the first twenty-four stages of stepping chain 130. This data will, however, not be recorded on either recorder, since they are both in inoperative condition at this time. Moreover, since gates 137 in the feedback circuit are now closed, the data read out from the storage unit will not be re-stored therein, so that the effect of read-out will be to erase the previously stored data and thereby prepare the storage unit for the new header card data. As columns 29 through 6 of the new header card pass the reading station 37, this header card data will be applied through gates 111 to the storage unit and will be stored, column by column, therein.

Meanwhile the next detail card will be passing through the code sensing station 35. This card will be assumed to have both a "1" punch and a "9" punch in its 79th column, indicating that it is to be recorded on both recorders A and B. When the "1" punch is detected, flip-flop FFB will be turned On, opening Start gate 92 associated with recorder B. A short time later, when the "9" punch is detected, flip-flop FFA will similarly be turned On to open Start gate 92 associated with recorder A. Thus, when the next control pulse appears on line 75 at the beginning of the next card cycle, both recorders A and B will be placed in operation. As before, the second control pulse will then reset both FFA and FFB. Read-out of information from the storage unit and the re-storing thereof will proceed as before since flip-flop FFD will have been reset to its Off position, closing gates 111 and opening gates 137 in response to the first control pulse at the beginning of this card cycle. Since both recorders A and B will be operating, the data read out from the storage unit 112 will therefore be recorded on the tapes of both recorders and, as the card passes the reading station 37, the data from this card will similarly be recorded on both recorders.

Since the next card is to be recorded only on recorder A, it carries only an identifying "9" punch in its 79th column, and while the preceding card is being read at the reading station this card is passing through the code sensing station 35. When the "9" punch is detected by detector 81, flip-flop FFA will once again be energized, closing Stop gate 93 for recorder A and again opening Start gate 92 for this recorder. Thus when the first control pulse of the next card cycle occurs, only recorder B will be stopped since the Stop gate 93 of recorder A will be closed. Recorder A will therefore continue to run and to record the header card data from the storage unit 113 and the data from the detail card itself as previously described.

Thus it can be seen that we have provided an extremely flexible and effective card-to-tape converter which is especially well adapted for use, as indicated, in conjunction with a subscription fulfillment system. However, it is obvious that the card-to-tape recorder disclosed herein is equally capable of use in many other applications.

While for purposes of this description, the card-to-tape converter has been illustrated as being used in conjunction with but two recorders, it is obvious that any desired number of recorders can be utilized. Any additional recorders would be controlled similarly to recorders A and B and data would likewise be supplied to them as is the case with recorders A and B. Moreover, while facilities for storing twenty-four columns of data have been specifically disclosed herein, it is believed obvious that any desired number of storage columns could be provided, depending upon the amount of data which it is desired to record from the header cards along with that from the associated detail cards. Obviously, the inter-card spacing may similarly be varied in accordance with the amount of data which it is desired to record from the header cards.

While electronic stepping chains, flip-flops, and gates have been shown and described, equivalent switches or relays could obviously be substituted therefor without invention and without in any way affecting the principle of operation thereof. Other types of synchronizing means, hole sensing means, and data storage devices could also be utilized in place of those specifically described. Many other changes will be apparent to those skilled in the art and could obviously be made without departing from the spirit and scope of the invention as defined by the appended claims.

We claim:

1. In a card-to-tape converter for recording data from a series of data-bearing cards including cards of two general classes identified respectively as master cards and detail cards, said cards of each class bearing distinctive code symbols thereon, means for sensing the code symbols and data carried by said cards, means for cyclically feeding said cards in spaced relationship to one another past said sensing means, a recorder, a data-storage device, means responsive to and selectively controlled by the sensed code symbols carried by a master card for rendering said storage device operative to store the data sensed by said sensing means during each card cycle wherein a master card traverses said sensing means, and means responsive to and selectively controlled by the sensed code symbols carried by a detail card for rendering said recorder operative during a card cycle wherein a detail card traverses said sensing means to record in sequence the data previously stored in said storage device and the data sensed from such detail card by said sensing means.

2. In a card-to-tape converter for recording data from a series of data-bearing cards, each series including a master card and a plurality of classes of detail cards, said master card and each class of detail cards being respectively identifiable by means of predetermined code symbols carried by said cards, a code-sensing station for producing an output in response to said code symbols, a data-reading station for producing an output in response to the data carried by said cards, means for cyclically feeding said cards serially in spaced relationship to one another past said stations, a plurality of recorders, a data storage device, means controlled by the output of said code-sensing station for selectively rendering each recorder individually operative to record the output from said reading station during passage of a particular class of detail card therethrough, means controlled by the output of said code-sensing station upon detection of a master card for rendering said recorders nonresponsive and said data storage device responsive to the output of said reading station to store the output therefrom as said master card traverses said reading station, and means for causing said storage device to read out the stored output therefrom to said recorders during the intervals between cards at said reading station whereby the output representing the data from said master card will be recorded immediately adjacent to the output representing the data of each card of at least one class of said detail cards.

3. In a card-to-tape converter for recording, column by column, data from a series of data-bearing cards including cards of two general classes identified respectively as master cards and detail cards, the master cards being distinguishable from the detail cards by distinctive code symbols carried by at least one of the two classes of cards, a code-sensing station for producing an output in response to said code symbols, a data-reading station for producing an output in response to the data carried by said cards, and means for cyclically feeding said cards serially in spaced relationship to one another past said stations, a recorder, means normally rendering said recorder responsive to the output of said reading station during passage of a detail card therethrough for recording such output of said reading station, a data storage device, and means controlled by the output of said code sensing station for rendering said storage device operative to store the output of said reading station as a master card traverses said reading station and for causing said recorder to record the stored output from said storage device during the interval immediately preceding the recording of the output from said reading station during passage of each succeeding detail card ahead of the next master card in said series.

4. In a card-to-tape converter for recording, column by column, data from a series of data-bearing cards of two general classes identified respectively as master cards and detailed cards, the master cards being distinguishable from the detail cards by distinctive code symbols carried by at least one of the two classes of cards, a code-sensing station for producing an output in response to said code symbols, a data-reading station for producing an output in response to the data carried by said cards, and means for cyclically feeding said cards serially in spaced relationship to one another past said stations, a recorder, means normally rendering said recorder responsive to the output of said reading station during passage of a detail card therethrough for recording such output of said reading station, a data storage device, means responsive to the output of said code-sensing station during passage of one of said cards therethrough for selectively rendering said recorder and said storage device responsive to the output of said data-reading station during passage of said one card through said reading station, and means synchronized with the movement of the cards by said feeding means for rendering said storage device operative to read-out the output stored therein to said recorder during the interval between cards at said reading station.

5. In a card-to-tape converter for recording, column by column, data from a series of data-bearing cards including cards of two general classes identified respectively as master cards and detail cards, the master cards being distinguishable from the detail cards by distinctive code symbols carried by at least one of the two classes of cards, a code-sensing station for producing an output in response to said code symbols, a data-reading station for producing an output in response to the data carried by said cards, and means for cyclically feeding said cards serially in spaced relationship to one another past said stations, a recorder, a data storage device, means responsive to the output of said code-sensing station for selectively rendering said recorder and said storage device responsive to the output of said data-reading station during passage of a card therethrough, the selection depending respectively upon whether such card, which is next to pass through the said reading station, is a detail card or a master card, and means synchronized with the movement of each of said cards by said feeding means for rendering said storage device operative to read-out output stored therein to said recorder during the interval between cards at said reading station.

6. In a card-to-tape converter for recording, column by column, data from a series of data-bearing cards including cards of two general classes identified respectively as master cards and detail cards, the master cards being distinguishable from the detail cards and the detail cards of each class of detail cards being distinguishable from detail cards of other classes thereof by predetermined code symbols carried by said cards, a code-sensing station for producing an output in response to said code symbols, a data-reading station for producing an output in response to the data carried by said cards, and means for cyclically feeding said cards serially in spaced relationship to one another past said stations, a recorder, a data storage device, said recorder being connected to the outputs of said data storage device and of said reading station, means responsive to the sensing of a master card at said code-sensing station for connecting the output of said reading station to the input of said storage device to store the data from said master card as the latter traverses said reading station, means for cyclically reading-out to said recorder and erasing the output stored in said storage device during a portion of each inter-card interval at said reading station, feed-back means normally connecting the output of said storage device to the input thereof whereby the output read-out and erased therefrom will normally be re-stored therein, means responsive to the sensing of a master card at said code-sensing station for rendering said feed-back means inoperative during said portion of the inter-card interval immediately preceding the entry of a master card into said reading station, and means responsive to detection at said code sensing station of the code symbols identifying detail cards of a selected class thereof for rendering said recorder responsive to the outputs of said storage device and said reading station during the passage of such detail cards past said reading station and during the said portion of the inter-card interval immediately preceding such passage.

7. In a card-to-tape converter for recording data from a series of data-bearing cards including a plurality of classes of cards respectively identifiable by means of predetermined code symbols carried by said cards, a code sensing station for producing an output in response to said code symbols, a data-reading station for producing an output in response to the data carried by said cards, means for cyclically feeding said cards serially in spaced relationship to one another past said stations, a plurality of recorders, a data storage device, means controlled by the output of said code-sensing station for selectively rendering said recorders and said data storage device individually responsive to the output of said reading station in accordance with the class of cards passing therethrough, and means rendered operative during each inter-card interval at said reading station for applying the output previously stored in said storage device to each of said recorders.

References Cited in the file of this patent

UNITED STATES PATENTS

| | | |
|---|---|---|
| 2,566,932 | Dayger | Sept. 4, 1951 |
| 2,702,380 | Brustman | Feb. 15, 1955 |
| 2,721,990 | McNaney | Oct. 25, 1955 |